United States Patent
Kubota et al.

[11] Patent Number: 5,846,306
[45] Date of Patent: Dec. 8, 1998

[54] INK SET FOR INK JET RECORDING AND INK JET RECORDING METHOD USING THE SAME

[75] Inventors: Kazuhide Kubota; Kiyohiko Takemoto, both of Suwa, Japan

[73] Assignee: Seiko Epson Corporation, Tokyo-to, Japan

[21] Appl. No.: 764,090

[22] Filed: Dec. 6, 1996

[30] Foreign Application Priority Data

Dec. 8, 1995 [JP] Japan .................................. 7-320859
Sep. 2, 1996 [JP] Japan .................................. 8-231791

[51] Int. Cl.$^6$ ............................................. C09D 11/02
[52] U.S. Cl. ................... 106/31.75; 106/31.6; 106/31.78
[58] Field of Search ............................... 106/31.6, 31.75, 106/31.78

[56] References Cited

U.S. PATENT DOCUMENTS

| | | | |
|---|---|---|---|
| 4,784,905 | 11/1988 | Suzuki et al. | 428/321.3 |
| 5,420,187 | 5/1995 | Endo et al. | 106/31.76 |
| 5,549,740 | 8/1996 | Takahashi et al. | 106/31.43 |
| 5,624,484 | 4/1997 | Takahashi et al. | 106/31.75 |
| 5,658,376 | 8/1997 | Noguchi et al. | 106/31.43 |

FOREIGN PATENT DOCUMENTS

| | | |
|---|---|---|
| 0302973 | 2/1989 | European Pat. Off. . |
| 0448055 | 9/1991 | European Pat. Off. . |
| 0618279 | 10/1994 | European Pat. Off. . |
| 0663299 | 7/1995 | European Pat. Off. . |
| 0697445 | 2/1996 | European Pat. Off. . |
| 621426 | 3/1981 | Japan . |
| 356573 | 3/1991 | Japan . |
| 379678 | 4/1991 | Japan . |
| 379680 | 4/1991 | Japan . |
| 3160068 | 7/1991 | Japan . |
| 3252467 | 11/1991 | Japan . |
| 418462 | 1/1992 | Japan . |
| 5155006 | 6/1993 | Japan . |
| 5202328 | 8/1993 | Japan . |
| 6106735 | 4/1994 | Japan . |

OTHER PUBLICATIONS

Patent Abstracts of Japan, Publication No. 56028256–JP621426, Mar. 1981.
Patent Abstracts of Japan, Publication No. 03056573A–JP356573, Mar. 1991.
Patent Abstracts of Japan, Publication No. 03079680A–JP3798680, Apr. 1991.
Patent Abstracts of Japan, Publication No. 03079678A–JP379678, Apr. 1991.
Patent Abstracts of Japan, Publication No. 03160068A–JP3160068, Jul. 1991.
Patent Abstracts of Japan, Publication No. 03252467A–JP3252467, Nov. 1991.
Patent Abstracts of Japan, Publication No. 04018462A–JP418462, Jan. 1992.
Patent Abstracts of Japan, Publication No. 051155006A–JP5155006, Jun. 1993.
Derwent Abstract WPI Acc. No. 93–102754/13 JP5202328, Aug. 1993.
Patent Abstracts of Japan, Publication No. 06106735A, Apr. 1994.

(List continued on next page.)

*Primary Examiner*—Helene Klemanski
*Attorney, Agent, or Firm*—Ladas & Parry

[57] ABSTRACT

A cyan ink, for ink jet recording, capable of realizing good lightfastness and waterfastness and, in addition, capable of realizing a good image, especially an image having good hue, and an ink set comprising the above cyan ink in combination with a magenta ink and a yellow ink are provided. The use of a combination of C.I. Pigment Blue 60, 22, 64, or 21 with C.I. Pigment Blue 15:3 as a cyan ink enables the formation of a good image. An ink set comprising this cyan ink composition in combination with a yellow ink comprising C.I. Pigment Yellow 109 and C.I. Pigment Yellow 110 and a magenta ink comprising C.I. Pigment Red 122 or C.I. Pigment Red 209 can realize a good image.

27 Claims, 4 Drawing Sheets

OTHER PUBLICATIONS

Database WPI Section CH, Week 9342 Derwent Publications Ltd., London, GB; Class A97, AN 93–331590 X P002041085 & JP 05 239 373 A (Mitsubishi Kasei Corp), 17 Sep. 1993 Abstract.

Database WPI Section CH, Week 9151 Derwent Pulications Ltd., London, GB; Class A18, AN 91–374073 X JP 03 252 467 A (Mitsubishi Kasei Corp), 11 Nov. 1991 Abstract.

Patent Abstract of Japan vol. 15, No. 248 (C–0843), 25 Jun. 1991 & JP 03 079680 A (Mitsubishi Kasei Corp), 4 Apr. 1991, Abstract.

INK SET FOR INK JET RECORDING AND INK JET RECORDING METHOD USING THE SAME

BACKGROUND OF THE INVENTION

1. Field of the Invention

The present invention relates to cyan and yellow ink compositions for ink jet recording, an ink set comprising the ink composition, and an ink jet recording method wherein a reaction solution and an ink composition are deposited onto a recording medium to conduct printing.

2. Background Art

Ink jet recording is a printing method wherein droplets of an ink composition are ejected and deposited onto a recording medium such as paper. This method has a feature that an image with high resolution and high quality can be realized at a high speed by means of a relatively inexpensive apparatus.

The ink composition used in the ink jet recording, in general, comprises water as a main solvent and, added thereto, a colorant and a wetting agent, such as glycerin, for preventing clogging. Regarding the colorant used in the ink composition for ink jet recording, a large number of water-soluble dyes have been used because of their high chroma, abundance, and good solubility in water and the like.

However, dyes are poor in various properties, such as lightfastness and waterfastness, and, hence, prints formed by using dye compositions have poor lightfastness and waterfastness. The waterfastness of the prints has been improved for a specialty paper, for ink jet recording, having an ink-absorptive layer, whereas it is unsatisfactory for plain papers.

On the other hand, pigments have better lightfastness and waterfastness than dyes. This has been led to studies on the use of pigments as colorants in an ink composition for ink jet recording. The pigments are generally insoluble in water. Thus, when the use of a pigment in an aqueous ink composition is contemplated, it is necessary to disperse the pigment in water with a resin and the like as "dispersant" before the preparation of an ink composition.

In order to stably disperse the pigment, the consideration should be given to the type and particle diameter of the pigment, the type of the resin used, dispersing means and the like. Many dispersing systems and inks for ink jet recording have hitherto been proposed in the art. For example, Japanese Patent Laid-Open No. 252467/1991 proposes an ink composition comprising water, a styrene/maleic acid copolymer, ε-caprolactum, and a pigment. Further, Japanese Patent Laid-Open No. 79680/1991 discloses an ink composition comprising an aqueous medium, a styrene/maleic acid copolymer, and a copper phthalocyanine pigment.

Studies on the use of pigments in inks for ink jet recording range from black inks to color inks.

The method in which a polyvalent metallic salt solution is applied on a recording medium followed by the application of an ink composition containing a dye having at least one carboxyl group has been recently proposed, for example, in Japanese Patent Laid-Open No. 202328/1993. The claimed advantage of this method is that the polyvalent metal ion combines with the dye to form an insoluble complex which can offer an image having waterfastness and high quality free from color bleeding.

Further, Japanese Patent Laid-Open No. 106735/1994 discloses the use of a color ink containing a surfactant or a solvent for imparting a penetrating property and a salt in combination with a black ink capable of being thickened or agglomerated with the salt. The claimed advantage of this method is that a high-quality color image having a high image density and free from color bleeding is realized. In this method, two liquids, i.e. a solution containing a salt as first and an ink composition as second, are printed in order to yield a good image.

Although pigments have better lightfastness and waterfastness, the type of usable pigments for this purpose is limited as compared with dyes. When pigments are actually used in the ink for ink jet recording, not only the lightfastness and the waterfastness but hue should be sufficiently studied. Properties such as lightfastness, waterfastness, and storage stability of ink compositions including a pigment for ink jet recording have been studied. However, studies on the hue of the ink composition including pigment and a change in hue of the ink composition when used in the ink jet recording method are made unsatisfactory.

SUMMARY OF THE INVENTION

We have now found that, in a color ink jet recording method, cyan and yellow ink compositions containing specific pigments can realize good images. Further, we have found that a combination of the above cyan ink composition or yellow ink composition with other color ink composition(s) can provide good images. Furthermore, we have found that these ink compositions, when used in an ink jet recording method using the so-called "two liquids" wherein a reaction solution and an ink composition are deposited to conduct printing, can yield good images.

Accordingly, an object of the present invention is to provide cyan and yellow ink compositions, for ink jet recording, which can realize good lightfastness and waterfastness and, in addition, good images, especially images having good hue.

Another object of the present invention is to provide an ink set, for ink jet recording, which can realize good lightfastness and waterfastness and, in addition, good images, especially images having good hue.

A further object of the present invention is to provide an ink jet recording method, using two liquids, which can realize good lightfastness and waterfastness and, in addition, good images, especially images having good hue.

According to one aspect of the present invention, there is provided a cyan ink composition comprising at least one pigment represented by the following formula (I):

(I)

wherein x is an integer of 0 to 3; or, a pigment represented by the following formula (II):

(II)

or a mixture of the pigment represented by the formula (I) with the pigment represented by the formula (II).

According to another aspect of the present invention, there is provided a yellow ink composition for ink jet recording, comprising a pigment represented by the following formula (III):

(III)

wherein $Y_1$ to $Y_8$ each independently represent a chlorine or hydrogen atom and R represents o-phenylene or 2,6-xylyl, or C.I. Pigment Yellow 74, 138, 150 or 180.

According to still another aspect of the present invention, there is provided an ink set for ink jet recording, comprising a cyan ink composition, a magenta ink composition, and a yellow ink composition, wherein the cyan ink composition is the above cyan ink composition of the present invention.

According to a further aspect of the present invention, there is provided an ink set for ink jet recording, comprising a cyan ink composition, a magenta ink composition, and a yellow ink composition, wherein the yellow ink composition is the above yellow ink composition of the present invention.

According to a still further aspect of the present invention, there is provided an ink set for ink jet recording, comprising a cyan ink composition, a magenta ink composition, and a yellow ink composition, wherein the cyan ink composition is the above cyan ink composition of the present invention and the yellow ink composition is the above yellow ink composition of the present invention.

According to another aspect of the present invention, there is provided a ink jet recording method, comprising the step of: depositing a reaction solution containing a reactant and an ink composition onto a recording medium, wherein the ink composition is the above cyan ink composition of the present invention or an ink composition in the above ink set, and the reactant breaks the state of dispersion and/or dissolution of the pigment to cause agglomeration.

DETAILED DESCRIPTION OF THE INVENTION

Cyan ink composition

The cyan ink composition for ink jet recording according to the present invention comprise, as a colorant, at least one pigment represented by the formula (I), a pigment represented by the formula (II), or a mixture of the pigment represented by the formula (I) with the pigment represented by the formula (II).

Specific examples of pigments represented by the formula (I) include C.I. Pigment Blue 60 (x=0), C.I. Pigment Blue 22 (x=1), C.I. Pigment Blue 64 (x=2), and C.I. Pigment Blue 21 (x=3).

Specific examples of pigments represented by the formula (II) include C.I. Pigment Blue 15:3.

The cyan ink composition, according to the present invention, comprising a mixture of the above pigments can realize good lightfastness and waterfastness and, at the same time, a good image having good hue. Further, according to the cyan ink composition of the present invention, color shading observed in the printing obtained with an ink composition using only the pigment represented by the formula (II), especially C.I. Pigment Blue 15:3, can be unexpectedly eliminated by combining the pigment represented by the formula (II) with the pigment represented by the formula (I), especially C.I. Pigment Blue 60, 22, 64, or 21. This also is an advantage of the present invention.

The ratio of the content of the pigment represented by the formula (I) to the pigment represented by the formula (II) is preferably in the range of from about 1:2 to 1:10, more preferably about 1:2 to 1:8, most preferably about 1:2 to 1:5, in terms of the weight ratio.

The cyan ink composition according to the present invention comprises water in addition to the pigment. The amount of the pigment added to the cyan ink composition is not limited but may be determined in such an amount range as will realize good waterfastness and lightfastness and, in addition, an image having good hue. For example, it is preferably not more than 6% by weight.

In the present invention, preferably, the pigment is added, as a pigment dispersion which is previously prepared by dispersing the pigment in an aqueous medium with the aid of a dispersant or a surfactant. Preferred dispersants include those commonly used in the preparation of pigment dispersions, for example, polymeric dispersants.

According to a preferred embodiment of the present invention, the cyan ink composition further comprises an organic solvent. The organic solvent is preferably a low-boiling organic solvent. Preferred examples of low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink.

Further, according to a preferred embodiment of the present invention, the ink composition further comprises a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monomethyl ether, ethylene glycol monobutyl ether, diethylene glycol monomethyl ether, diethylene glycol monoethyl ether, diethylene glycol monobutyl ether, triethylene glycol monomethyl ether, and triethylene glycol monoethyl ether, and triethylene glycol monobutyl ether; urea, 2-pyrrolidone, N-methyl-2-pyrrolidone, 1,3-dimethyl-2-imidazolidinone, and triethanolamine.

The amount of the low-boiling organic solvent added is preferably in the range of from 0.5 to 10% by weight, more preferably in the range of from 1.5 to 6% by weight, based on the ink composition. The amount of the high-boiling organic solvent added is preferably about 0.5 to 40% by weight, more preferably about 2 to 20% by weight.

According to a preferred embodiment of the present invention, the cyan ink composition comprises a surfactant. Preferred examples of surfactants usable herein include anionic surfactants (for example, sodium dodecylbenzenesulfonate, sodium laurate and an ammonium salt of a polyoxyethylene alkyl ether sulfate); nonionic surfactants (for example, a polyoxyethylene alkyl ether, a polyoxyethylene alkyl ester, a polyoxyethylene sorbitan fatty acid ester, a polyoxyethylene alkyl phenyl ether, a polyoxyethylene alkylamine, and a polyoxyethylene alkylamide). They may be used alone or as a mixture of two or more. Further, it is also possible to use acetylene glycol (OLFINE Y and Surfynol 82, 104, 440, 465, and 485 (all the above products being manufactured by Air Products and Chemicals Inc.).

According to a preferred embodiment of the present invention, the cyan ink composition comprises a resin emulsion. The term "resin emulsion" used herein refers to an emulsion comprising water as a continuous phase and the following resin component as a dispersed phase. Resin components as the dispersed phase include acrylic resin, vinyl acetate resin, styrene/butadiene resin, vinyl chloride resin, (meth)acrylate/styrene resin, butadiene resin, styrene resin, crosslinked acrylic resin, crosslinked styrene resin, benzoguanamine resin, phenolic resin, silicone resin, and epoxy resin.

According to a preferred embodiment of the present invention, the resin is a polymer having a combination of a hydrophilic segment with a hydrophobic segment. The particle diameter of the resin component is not particularly limited so far as the resin component forms an emulsion. It, however, is preferably not more than about 150 nm, more preferably about 5 to 100 nm.

The above resin emulsion may be prepared by subjecting a monomer(s) for forming a contemplated resin to dispersion polymerization in water optionally in the presence of a surfactant. For example, an emulsion of an acrylic resin or a styrene/acrylic resin may be prepared by subjecting an ester of (meth)acrylic acid or alternatively an ester of (meth)acrylic acid in combination with styrene to dispersion polymerization in water optionally in the presence of a surfactant. In general, the ratio of the resin component to the surfactant is preferably about 10:1 to 5:1. When the amount of the surfactant used falls within the above range, it is possible to provide an ink composition which has good water resistance in the form of an image and good penetrability. Although the surfactant is not particularly limited, preferred examples thereof include those described above.

The ratio of the resin as the component constituting the dispersed phase to water is suitably 60 to 400 parts by weight based on 100 parts by weight of the resin with 100 to 200 parts by weight, based on 100 parts by weight of the resin, of water being preferred.

Known resin emulsions may also be used as the above resin emulsion. For example, resin emulsions described in Japanese Patent Publication No. 1426/1987 and Japanese Patent Laid-Open Nos. 56573/1991, 79678/1991, 160068/1991, and 18462/1992 as such may be used as the resin emulsion in the present invention.

Further, commercially available resin emulsions may also be used, and examples thereof include Microgel E-1002 and E-5002 (styrene/acrylic resin emulsion, manufactured by Nippon Paint Co., Ltd.), Voncoat 4001 (acrylic resin emulsion, manufactured by Dainippon Ink and Chemicals, Inc.), Voncoat 5454 (styrene/acrylic resin emulsion, manufactured by Dainippon Ink and Chemicals, Inc.), SAE-1014 (styrene/acrylic resin emulsion, manufactured by Nippon Zeon Co., Ltd.), and Saivinol SK-200 (acrylic resin emulsion, manufactured by Saiden Chemical Industry Co., Ltd).

In the cyan ink composition according to the present invention, the amount of the resin emulsion incorporated therein is preferably such that the amount of the resin component is in the range of from 0.1 to 40% by weight, more preferably in the range of from 1 to 25% by weight. The resin emulsion has the effect of inhibiting the penetration of a coloring component into the recording medium and, further, accelerating the fixation on the medium. Further, some resin emulsions have an additional effect that they form a film on the surface of an ink image on the recording medium to improve the rubbing resistance of the resultant print.

According to a preferred embodiment of the present invention, the ink composition contains a thermoplastic resin in the form of a resin emulsion. In this embodiment, the thermoplastic resin has a softening temperature of 50° to 250° C., preferably 60° to 200° C. The term "softening temperature" used herein refers to the lowest temperature among the glass transition temperature of the thermoplastic resin, the melting point of the thermoplastic resin, the temperature which brings the viscosity of the thermoplastic resin to $10^{11}$ to $10^{12}$ poises, the pour point of the thermoplastic resin, and the minimum film forming temperature (MFT) in the form of an emulsion of the thermoplastic resin. In the step of heating according to the method of the present invention, the recording medium is heated to at least the softening temperature of the thermoplastic resin.

Further, preferably, the thermoplastic resin, when heated at the softening or melting temperature or a higher temperature and then cooled, forms a strong film having water resistance and rubbing resistance.

Specific examples of water-insoluble thermoplastic resins include, but not limited to, polyacrylic acid, polymethacrylic acid, an ester of polymethacrylic acid, polyethylacrylic acid, a styrene/butadiene copolymer, polybutadiene, an acrylonitrile/butadiene copolymer, a chloroprene copolymer, a fluororesin, polyvinylidene fluoride, polyolefin resin, cellulose, a styrene/acrylic acid copolymer, a styrene/methacrylic acid copolymer, polystyrene, a styrene/acrylamide copolymer, polyisobutyl acrylate, polyacrylonitrile, polyvinyl acetate, polyvinyl acetal, polyamide, rosin resin, polyethylene, a polycarbonate, a polyvinylidene chloride resin, a cellulosic resin, a vinyl acetate resin, an ethylene/vinyl acetate copolymer, a vinyl acetate/(meth)acrylate copolymer, a vinyl chloride resin, polyurethane, and a rosin ester.

Specific examples of low-molecular weight thermoplastic resins include polyethylene wax, montan wax, alcohol wax, synthetic oxide wax, an α-olefin/maleic anhydride copolymer, animal and vegetable waxes such as carnauba wax, lanolin, paraffin wax, and microcrystalline wax.

According to a preferred embodiment of the present invention, the cyan ink composition according to the present invention contains a saccharide. Examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein refers to saccharides, in a broad sense, including substances which widely exist in the natural world, such as alginic acid, α-cyclodextrin, and cellulose.

Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbitol.

The content of the above saccharide is suitably in the range of from 0.1 to 40% by weight, preferably 0.5 to 30% by weight, based on the ink.

Further, if necessary, pH adjustors, preservatives, antimolds and the like may be added.

Yellow ink composition

The yellow ink composition according to the present invention comprises, as a colorant, a pigment represented by the formula (III) or C.I. Pigment Yellow 74, 138, 150 or 180 as defined above.

According to a preferred embodiment of the present invention, the yellow ink composition comprises, as a pigment represented by the formula (III), C.I. Pigment Yellow 109 which is a pigment represented by the formula (III) wherein $Y_1$ to $Y_8$ represent a chlorine atom and R represents 2,6-xylyl and C.I. Pigment Yellow 110 which is a pigment represented by the formula (III) wherein $Y_1$ to $Y_8$ represent a chlorine atom and R represents o-phenylene. According to a further preferred embodiment of the present invention, the weight ratio of C.I. Pigment Yellow 109 to the content of C.I. Pigment yellow 110 is preferably in the range of from 60:40 to 99:1. The use of these two pigments in combination can realize good hue and color density.

The yellow ink composition according to the present invention comprises water in addition to the above pigment. The amount of the pigment added to the yellow ink composition is not limited but may be determined in such an amount range as will realize good waterfastness and lightfastness and, in addition, an image having good hue. For example, it is preferably not more than 6% by weight.

As the cyan ink composition, the yellow pigment may preferably be added to the ink composition as a pigment dispersion which is previously prepared by dispersing the pigment in an aqueous medium with the aid of a dispersant or a surfactant. Preferred dispersants include those commonly used in the preparation of pigment dispersions, for example, polymeric dispersants.

Further, as the cyan ink composition, the yellow ink composition according to the present invention preferably further comprises additives such as an organic solvent, a surfactant, a resin emulsion, a saccharose, a pH adjustor, a preservative, and an antimold. Specific examples thereof and the amount thereof added may be the same as those described above in connection with the cyan ink composition.

Ink set

The ink set according to the present invention basically comprises a cyan ink composition, a magenta ink composition, and a yellow ink composition, the cyan ink composition being the above cyan ink composition of the present invention.

The ink set according to another aspect of the present invention basically comprises a cyan ink composition, a magenta ink composition, and a yellow ink composition, the yellow ink composition being the above yellow ink composition of the present invention.

The ink set according to a further aspect of the present invention basically comprises a cyan ink composition, a magenta ink composition, and a yellow ink composition, the cyan ink composition being the above cyan ink composition of the present invention, the yellow ink composition being the above yellow ink composition of the present invention.

The ink set according to the present invention can realize good lightfastness and waterfastness and, in addition, an image having good hue.

In the ink set according to the present invention, the magenta ink composition is not particularly limited so far as it is not detrimental to the above good properties of the cyan ink composition and the yellow ink composition. However, a magenta ink composition comprising the following pigment as a colorant is preferred.

Specifically, a preferred magenta ink composition comprises, as a colorant, a pigment represented by the following formula (IV):

wherein $X_1$ to $X_{10}$ each independently represent a hydrogen or chlorine atom or a methyl group.

Specific examples of pigments represented by the formula (IV) include C.I. Pigment Red 122 which is a pigment represented by the formula (IV) wherein $X_2$ and $X_7$ represent a methyl group and the other substituents $X_1$, $X_2$ to $X_6$, and $X_8$ to $X_{10}$ represent a hydrogen atom and C.I. Pigment Red 209 which is a pigment represented by the formula (IV) wherein $X_3$ and $X_8$ represent a chlorine atom and the other substituents $X_1$, $X_2$, $X_4$ to $X_7$, and $X_9$ and $X_{10}$ represent a hydrogen atom.

The ink set using the above magenta ink composition can realize a good color image.

According to a preferred embodiment of the present invention, there is provided an ink set including the combination of the magenta ink composition containing C.I. Pigment Red 122 or 209 and the cyan ink composition containing C.I. Pigment Blue 60 as a pigment represented by the formula (I) or C.I. Pigment Blue 15:3 as a pigment represented by the formula (II).

According to a preferred embodiment of the present invention, the concentration of the magenta pigment in the magenta ink composition and the concentration of the yellow pigment in the yellow ink composition each are higher than the concentration of the cyan pigment in the cyan ink composition. More preferably, the pigment concentration is not more than 6% by weight for all the ink compositions and the ratio of the pigment concentration (% by weight) of the cyan ink composition to the pigment concentration (% by weight) of the magenta ink composition to the pigment concentration (% by weight) of the yellow ink composition is 1:1 to 2:1 to 3. According to this embodiment, an image having further improved hue can be realized.

The magenta ink composition constituting the ink set according to the present invention comprises at least water in addition to the above pigment. The amount of the pigment added to the ink composition is not limited but may be determined in such an amount range as will realize good waterfastness and lightfastness and, in addition, an image having good hue. For example, it is preferably not more than 6% by weight.

As with the cyan ink composition, in the magenta ink composition constituting the ink set according to the present invention, preferably, the pigment is added, as a pigment dispersion prepared by dispersing the pigment in an aqueous medium with the aid of a dispersant or a surfactant, to the ink composition. Preferred dispersants include those commonly used in the preparation of pigment dispersions, for example, polymeric dispersants.

Further, as with the cyan ink composition, the magenta ink composition constituting the ink set according to the present invention preferably further comprises additives such as an organic solvent, a surfactant, a resin emulsion, a saccharose, a pH adjustor, a preservative, and an antimold. Specific examples thereof and the amount thereof added may be the same as those described above in connection with the cyan ink composition.

Ink jet recording method using two liquids

The cyan ink composition and the ink set according to the present invention may form an image by ink jet recording. Combination of the cyan ink composition or the ink set according to the present invention with the recording method using "two liquids" can offer a better image. In particular, good color development can be offered even on plain papers. Further, as compared with the sole use of the ink composition or the ink set, the combination of the ink composition for the ink set with the ink jet recording method using two liquids can offer improved lightfastness of the printed image.

The ink jet recording method according to the present invention involves the step of depositing a reaction solution containing a reactant and the cyan ink composition or an ink composition in the ink set of the present invention onto a recording medium. The term "reactant" used herein refers to a material which is able to break the state of dispersion and/or dissolution of the pigment and can agglomerate the pigment.

In the recording method using two liquids according to the present invention, a good print can be realized by contact of the reaction solution with the ink composition. Specifically, upon contact of the reaction solution with the ink composition, the reactant contained in the reaction solution breaks the state of dispersion of the pigment and other components in the ink composition, leading to agglomeration of the pigment and the other components. The agglomerate is considered to deposit onto the recording medium, realizing a print having high color density and no significant bleeding or feathering and unevenness. Further, advantageously, in the case of a color image, uneven color-to-color intermixing in the region of boundary between different colors, that is, color bleeding, can be effectively prevented.

In the method of the present invention, the reaction solution is brought into contact with the ink composition. The step of ejecting droplets of the ink composition onto the recording medium to record an image may be conducted either before or after the deposition of the reaction solution onto the recording medium. With the practice of the step of recording after the deposition of the reaction solution may be preferred.

The reaction solution may be selectively deposited on only the areas where the ink composition is deposited, or alternatively may be deposited on the whole area of the recording medium. The former method can minimize the consumption of the reaction solution and, hence, is cost-effective. In the former method, however, both the reaction solution and the ink composition should be deposited onto a contemplated position with certain accuracy. On the other hand, in the latter method, the requirement for the accuracy on the position of the deposition of the reaction solution and the ink composition is reduced as compared with the former method. However, the latter method is disadvantageous in that a large amount of the reaction solution is deposited onto the whole area of the recording medium, causing paper, when used as the recording medium, to be likely to curl upon drying. Therefore, which method is used may be determined by taking into consideration a combination of the ink composition with the reaction solution. In the former method, the reaction solution may be deposited by the ink jet recording method.

The reaction solution used in the present invention comprises a reactant which can break the state of dispersion of the colorant and the other components in the ink composition and can agglomerate the colorant component and the other components.

Examples of the reaction solution usable in the present invention include, as the reactant, a polyvalent metal salt, a polyamine, a polyamine derivative.

Preferred examples of the polyvalent metal salt include the salt which is constituted by divalent or higher polyvalent metallic ions and anions bonded to the polyvalent metallic ions and is soluble in water. Specific examples of polyvalent metallic ions include divalent metallic ions, such as $Ca^{2+}$, $Cu^{2+}$, $Ni^{2+}$, $Mg^{2+}$, $Zn^{2+}$, and $Ba^{2+}$, trivalent metallic ions, such as $Al^{3+}$, $Fe^{3+}$, and $Cr^{3+}$. Anions include $Cl^-$, $NO_3^-$, $I^-$, $Br^-$, $ClO_3^-$, and $CH_3COO^-$.

In particular, a metal salt constituted by $Ca^{2+}$ or $Mg^{2+}$ provides favorable results in terms of pH of the reaction solution and the quality of prints.

The concentration of the polyvalent metal salt in the reaction solution is not limited but may be determined so as to attain the effect of providing a good print quality and preventing clogging. It, however, is preferably about 0.1 to 40% by weight, more preferably about 5 to 25% by weight.

According to a preferred embodiment of the present invention, the polyvalent metal salt contained in the reaction solution is constituted by divalent or higher polyvalent metallic ions and nitrate ions or carboxylate ions bonded to the polyvalent metallic ions and is soluble in water.

The carboxylate ions are preferably derived from a carboxylic acid selected from the group consisting of a saturated aliphatic monocarboxylic acid having 1 to 6 carbon atoms and a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon residue in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

The polyallylamine and polyallylamine derivative usable in the reaction solution are cationic polymers which are soluble in water and can be positively charged in water. Such polymers include, for example, those represented by the following formulae (a), (b), and (c).

(a)

(b)

(c)

wherein $X^-$ represents a chloride, bromide, iodide, nitrate, phosphate, sulfate, or acetate ion.

In addition, a copolymer of an allylamine with a diallylamine and a copolymer of diallylmethylammmonium chloride with sulfur dioxide may also be used.

The content of the polyallylamine and the polyallylamine derivative is preferably 0.5 to 10% by weight based on the reaction solution.

According to a preferred embodiment of the present invention, the reaction solution may contain a wetting agent comprising a high-boiling organic solvent. The high-boiling organic solvent can prevent the reaction solution from being evaporated, preventing clogging of a recording head. Preferred examples of high-boiling organic solvents include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, and triethylene glycol monoethyl ether, and triethylene glycol monobutyl ether; urea, 2-pyrrolidone, N-methyl-2-pyrrolidone, 1,3-dimethyl-2-imidazolidinone, and triethanolamine.

Although the amount of the high-boiling organic solvent added is not particularly limited, it is preferably about 0.5 to 40% by weight, more preferably about 2 to 20% by weight.

According to a preferred embodiment of the present invention, the reaction solution comprises a low-boiling organic solvent. Preferred examples of low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink composition. The amount of the low-boiling organic solvent added is preferably in the range of from 0.5 to 10% by weight, more preferably in the range of from 1.5 to 6% by weight.

According to a preferred embodiment of the present invention, the reaction solution comprises a penetrating agent. Penetrating agents usable herein include various surfactants such as anionic, cationic, and amphoteric surfactants; alcohols such as methanol, ethanol, and isopropyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether. An ink jet recording apparatus for practicing the ink jet recording method according to the present invention will now be described with reference to the accompanying drawings.

Figure 1:
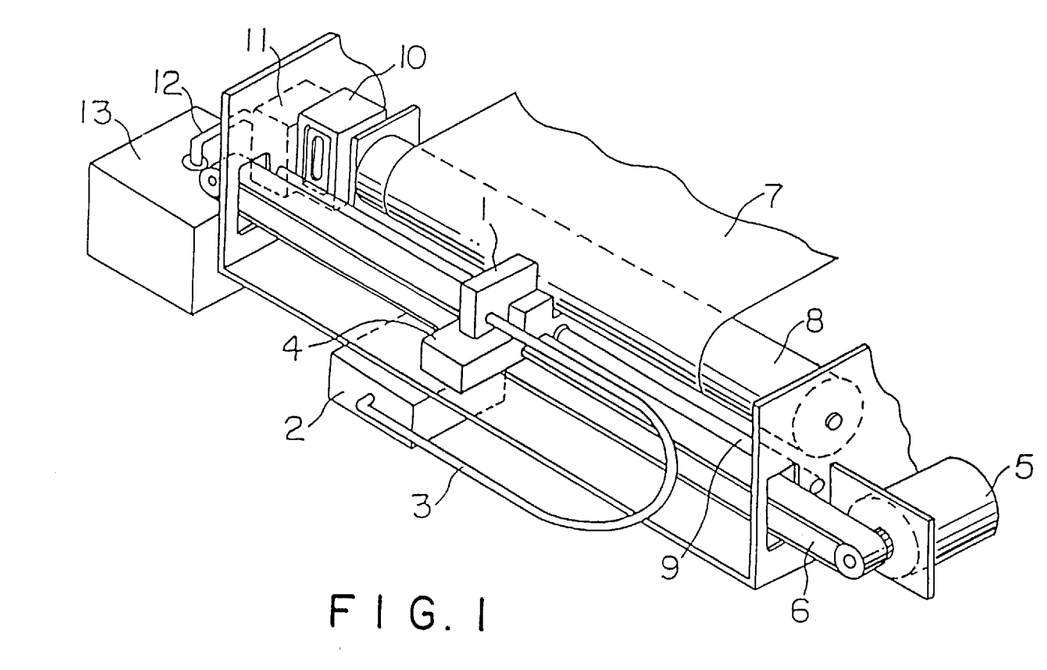
FIG. 1 shows an embodiment of the ink jet recording apparatus according to the present invention, wherein a recording head is provided separately from an ink tank to feed an ink composition and a reaction solution into a recording head through an ink tube.

FIG. 1 is a diagram showing an embodiment of an ink jet recording apparatus. In this embodiment, an ink composition and a reaction solution are accommodated in a tank and fed into a recording head through an ink tube. Specifically, a recording head 1 is communicated with an ink tank 2 through an ink tube 3. The interior of the ink tank 2 is partitioned, and a chamber for an ink composition, optionally a plurality of chambers respectively for a plurality of color ink compositions, and a chamber for a reaction solution are provided.

The recording head 1 is moved along a carriage 4 by means of a timing belt 6 driven by a motor 5. On the other hand, paper 7 as a recording medium is placed by a platen 8 and a guide 9 at a position facing the recording head 1. In this embodiment, a cap 10 is provided. A suction pump 11 is connected to the cap 10 in order to conduct the so-called "cleaning operation." The ink composition sucked by the pump 11 is resorvoired in a waste ink tank 13 through a tube 12.

Figure 2:
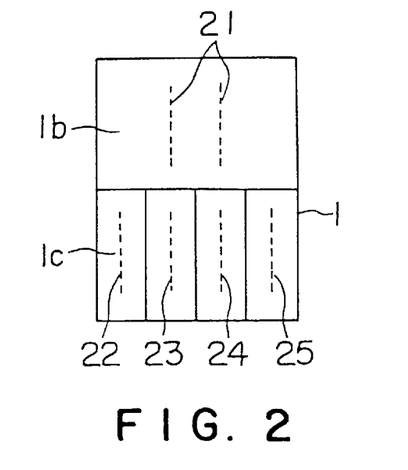
FIG. 2 is an enlarged view showing the surface of nozzles for a recording head, wherein reference character 1b designates the surface of a nozzle for a reaction solution and 1c the surface of a nozzle for an ink composition.

FIG. 2 is an enlarged view showing the surface of nozzles for the recording head 1. In the drawing, the surface of a nozzle for a reaction solution is indicated by 1b, and a nozzle 21 for ejecting the reaction solution is provided in the longitudinal direction. On the other hand, the surface of nozzles for the ink composition is indicated by 1c, and a yellow ink composition, a magenta ink composition, a cyan ink composition, and a black ink composition are ejected respectively through nozzles 22, 23, 24 and 25.

Figure 3:
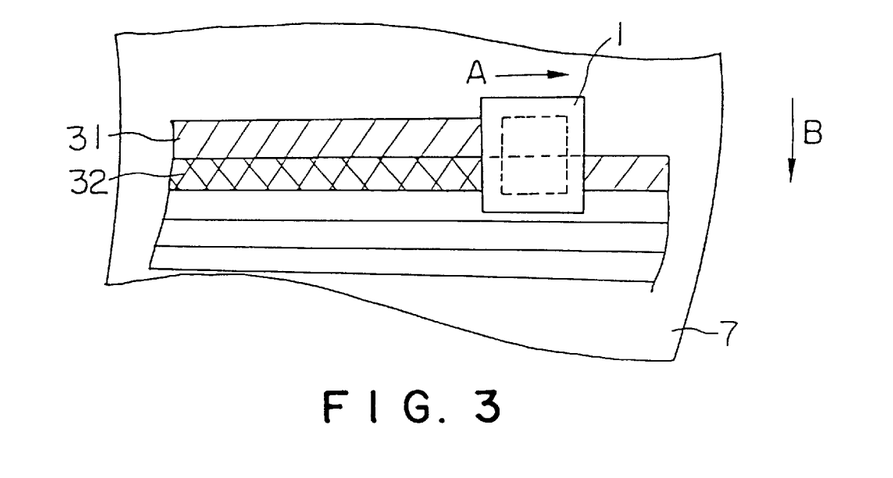
FIG. 3 is a diagram illustrating ink jet recording using the recording head shown in FIG. 2, wherein numeral 31 designates a region where a reaction solution has been deposited and numeral 32 a printed region where an ink composition has been printed on the deposited reaction solution.

Further, an ink jet recording method using the recording head shown in FIG. 2 will be described with reference to FIG. 3. The recording head 1 is moved in the direction indicated by an arrow A, during which time the reaction solution is ejected by the recording head 1 to form a reaction solution-deposited region 31 in a band form on the recording medium 7. Subsequently, the recording medium 7 is transferred by a predetermined extent in the direction indicated by an arrow B, during which time the recording head 1 is moved the direction opposite to that indicated by the arrow A and returned to the left end of the recording medium 7, and the recording head conduct printing using the ink composition on the reaction solution-deposited region 31, thereby forming a print region 32.

Figure 4:
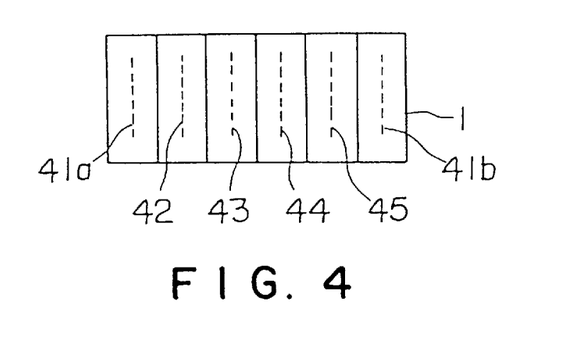
FIG. 4 shows another embodiment of the recording head according to the present invention, wherein all ejection nozzles are arranged in lateral direction.

Further, as shown in FIG. 4, in the recording head 1, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44 and 45. In the recording head according to this embodiment, the recording head 1, when reciprocated on the carriage, can conduct printing in both directions. Therefore, in this case, printing at a higher speed is expected as compared with the case where the recording head shown in FIG. 2 is used.

Further, when the reaction solution and the ink composition are preferably adjusted so as to fall within the surface tension ranges described above, a high-quality print can be more stably provided regardless of the order of deposition of the reaction solution and the ink composition. In this case, even the provision of a single ejection nozzle suffices for satisfactory results. For example, in the drawing, the nozzle 41b may be omitted. This can contribute to a further reduction in size of the head and a further increase in printing speed.

Figure 5:
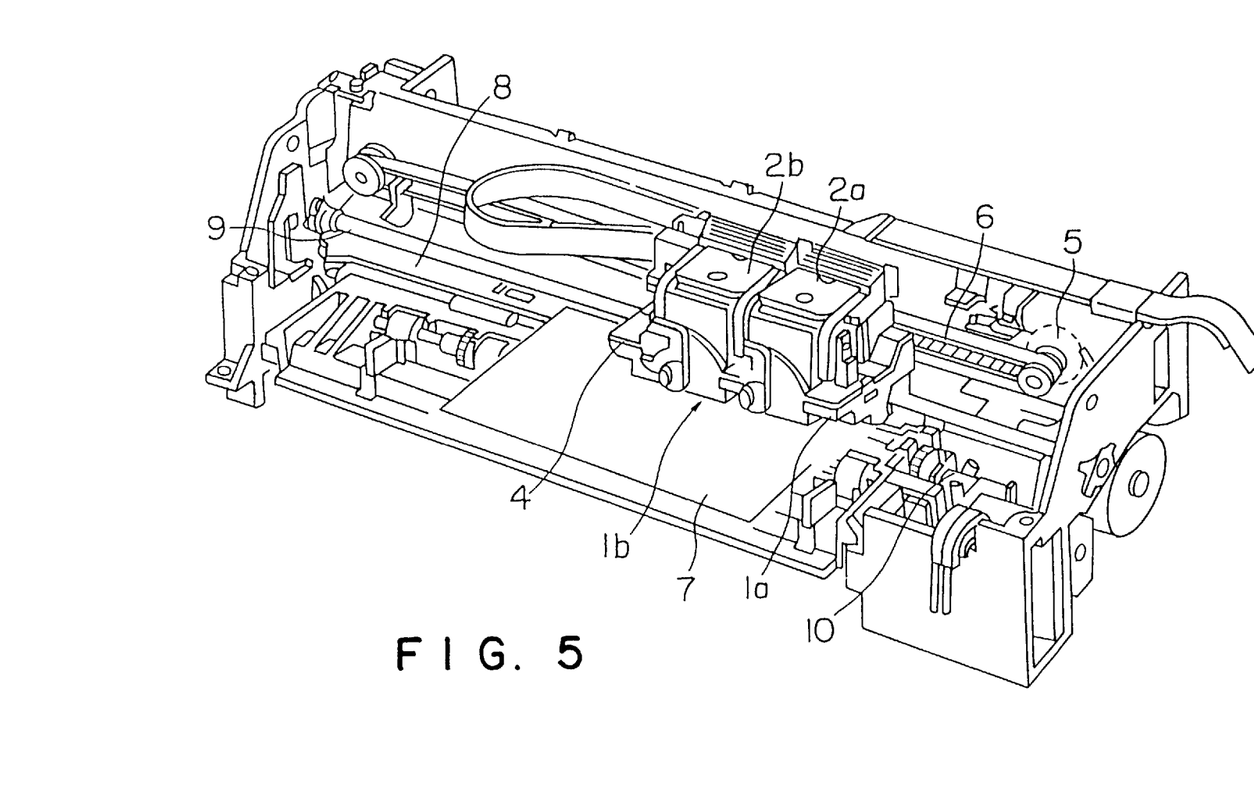
FIG. 5 shows an embodiment of the ink jet recording apparatus according to the present invention, wherein a recording head is integral with an ink tank.

In the ink jet recording apparatus, the supplement of the ink composition may be carried out by replacing an ink tank in a cartridge form. The ink tank may be integral with the recording head. A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1a and 1b are integral respectively with ink tanks 2a and 2b. An ink composition and a reaction solution are ejected respectively through the recording heads 1a and 1b. Basically, printing may be conducted in the same manner as described above in connection with the apparatus shown in FIG. 1. Further, in this embodiment, the recording head 1a is moved together with the ink tank 2a on a carriage 4, while the recording head 1a is moved together with the ink tank 2b on the carriage 4.

Figure 6:
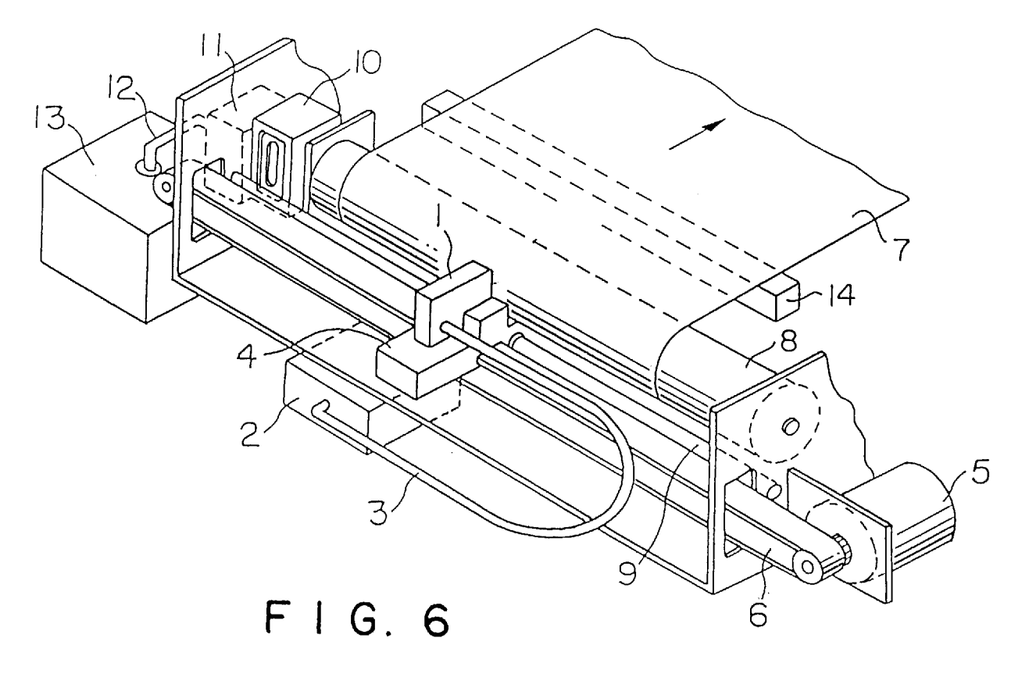
FIG. 6 shows another embodiment of the ink jet recording apparatus according to the present invention, wherein a heater is provided to heat a recording medium after printing.

A preferred embodiment of an ink jet recording apparatus wherein a heater for heating a printed recording medium is further provided is shown in FIG. 6. The embodiment shown in FIG. 6 is the same as the embodiment shown in FIG. 1, except that a heater 14 is additionally provided. The heater 14 may be of a contact type wherein, in heating the recording medium, it is brought into contact with the recording medium. Alternatively, the heating means may be of a non-contact type where the recording medium is heated by applying infrared rays or the like or blowing hot air to the recording medium.

EXAMPLES

The present invention will be described in more detail with reference to the following examples, though it is not limited to these examples only.

A reaction solution and ink compositions were prepared according to the following formulations.

| Reaction solution | |
|---|---|
| Magnesium acetate tetrahydrate | 25 wt % |
| Triethylene glycol monobutyl ether | 5 wt % |
| Glycerin | 20 wt % |
| Ion-exchanged water | Balance |
| Example 1 | |
| Pigment | |
| Cyan ink: C.I. Pigment Blue 15:3 | 1 wt % |
| C.I. Pigment Blue 60 | 0.5 wt % |
| Magenta Ink: C.I. Pigment Red 122 | 2 wt % |
| Yellow ink: C.I. Pigment Yellow 109 | 2.4 wt % |
| C.I. Pigment Yellow 110 | 1.8 wt % |
| Liquid medium | |
| Styrene/acrylic copolymer ammonium salt (molecular weight 7000, resin component 38%; dispersant | 1.5 wt % |
| Grandoll PP-1000 (styrene/acrylic resin emulsion, resin component 45%, manufactured by Dainippon Ink and Chemicals, Inc.) | 7 wt % |
| Maltitol | 7 wt % |
| Glycerin | 10 wt % |
| 2-Pyrrolidone | 2 wt % |
| Ion-exchanged water | Balance |
| Example 2 | |
| Pigment | |
| Cyan ink: C.I. Pigment Blue 15:3 | 2.5 wt % |
| C.I. Pigment Blue 60 | 0.25 wt % |
| Magenta Ink: C.I. Pigment Red 209 | 3 wt % |
| Yellow ink: C.I. Pigment Yellow 137 | 1.5 wt % |
| C.I. Pigment Yellow 173 | 2.5 wt % |
| Liquid medium | |
| Styrene/acrylic copolymer ammonium salt (molecular weight 7000, resin component 38%; dispersant) | 1.5 wt % |
| Voncoat 5454 (styrene/acrylic resin emulsion, resin component 45%, manufactured by Dainippon Ink and Chemicals, Inc.) | 5 wt % |
| Sucrose | 10 wt % |
| Glycerin | 10 wt % |
| 2-Pyrrolidone | 2 wt % |
| Ion-exchanged water | Balance |
| Example 3 | |
| Pigment | |
| Cyan ink: C.I. Pigment Blue 15:3 | 2 wt % |
| Magenta Ink: C.I. Pigment Red 122 | 2 wt % |
| Yellow ink: C.I. Pigment Yellow 109 | 2.4 wt % |
| C.I. Pigment Yellow 110 | 1.6 wt % |
| Liquid medium | |
| Styrene/acrylic copolymer ammonium salt (molecular weight 7000, resin component 38%; dispersant) | 1.5 wt % |

-continued

| Reaction solution | |
|---|---|
| Grandoll PP-1000 (styrene/acrylic resin emulsion, resin component 45%, manufactured by Dainippon Ink and Chemicals, Inc.) | 7 wt % |
| Maltitol | 7 wt % |
| Glycerin | 10 wt % |
| 2-Pyrrolidone | 2 wt % |
| Ion-exchanged water | Balance |

Example 4
Pigment

| | |
|---|---|
| Cyan ink: C.I. Pigment Blue 15:3 | 2 wt % |
| Magenta Ink: C.I. Pigment Red 122 | 4 wt % |
| Yellow ink: C.I. Pigment Yellow 109 | 5.94 wt % |
| C.I. Pigment Yellow 110 | 0.06 wt % |

Liquid medium

| | |
|---|---|
| Styrene/acrylic copolymer ammonium salt (molecular weight 7000, resin component 38%; dispersant) | 1.5 wt % |
| Voncoat 5454 (styrene/acrylic resin emulsion, resin component 45%, manufactured by Dainippon Ink and Chemicals, Inc.) | 5 wt % |
| Sucrose | 10 wt % |
| Glycerin | 10 wt % |
| 2-Pyrrolidone | 2 wt % |
| Ion-exchanged water | Balance |

Example 5
Pigment

| | |
|---|---|
| Cyan ink: C.I. Pigment Blue 15:3 | 2 wt % |
| Magenta Ink: C.I. Pigment Red 122 | 3 wt % |
| Yellow ink: C.I. Pigment Yellow 138 | 3 wt % |

Liquid medium

| | |
|---|---|
| Styrene/acrylic copolymer ammonium salt (molecular weight 7000, resin component 38%; dispersant) | 1.5 wt % |
| Voncoat 5454 (styrene/acrylic resin emulsion, resin component 45%, manufactured by Dainippon Ink and Chemicals, Inc.) | 5 wt % |
| Sucrose | 10 wt % |
| Glycerin | 10 wt % |
| 2-Pyrrolidone | 2 wt % |
| Ion-exchanged water | Balance |

Example 6
Pigment

| | |
|---|---|
| Cyan ink: C.I. Pigment Blue 15:3 | 1.5 wt % |
| C.I. Pigment Blue 60 | 0.5 wt % |
| Magenta Ink: C.I. Pigment Red 209 | 3 wt % |
| Yellow ink: C.I. Pigment Yellow 150 | 4 wt % |

Liquid medium

| | |
|---|---|
| Styrene/acrylic copolymer ammonium salt (molecular weight 7000, resin component 38%; dispersant) | 1.5 wt % |
| Grandoll PP-1000 (styrene/acrylic resin emulsion, resin component 45%, manufactured by Dainippon Ink and Chemicals, Inc.) | 5 wt % |
| Sucrose | 10 wt % |
| Glycerin | 10 wt % |
| 2-Pyrrolidone | 2 wt % |
| Ion-exchanged water | Balance |

Example 7
Pigment

| | |
|---|---|
| Cyan ink: C.I. Pigment Blue 15:3 | 2 wt % |

-continued

| Reaction solution | |
|---|---|
| Magenta Ink: C.I. Pigment Red 122 | 4 wt % |
| Yellow ink: C.I. Pigment Yellow 180 | 4 wt % |

Liquid medium

| | |
|---|---|
| Styrene/acrylic copolymer ammonium salt (molecular weight 7000, resin component 38%; dispersant) | 1.5 wt % |
| Grandoll PP-1000 (styrene/acrylic resin emulsion, resin component 45%, manufactured by Dainippon Ink and Chemicals, Inc.) | 5 wt % |
| Maltitol | 7 wt % |
| Glycerin | 10 wt % |
| 2-Pyrrolidone | 2 wt % |
| Ion-exchanged water | Balance |

Example 8
Pigment

| | |
|---|---|
| Cyan ink: C.I. Pigment Blue 15:3 | 1.5 wt % |
| C.I. Pigment Blue 60 | 0.5 wt % |
| Magenta Ink: C.I. Pigment Red 209 | 4 wt % |
| Yellow ink: C.I. Pigment Yellow 74 | 3 wt % |

Liquid medium

| | |
|---|---|
| Styrene/acrylic copolymer ammonium salt (molecular weight 7000, resin component 38%; dispersant) | 1.5 wt % |
| Voncoat 5454 (styrene/acrylic resin emulsion, resin component 45%, manufactured by Dainippon Ink and Chemicals, Inc.) | 5 wt % |
| Sucrose | 5 wt % |
| Glycerin | 15 wt % |
| 2-Pyrrolidone | 2 wt % |
| Ion-exchanged water | Balance |

Comparative Example 1
Pigment

| | |
|---|---|
| Cyan ink: C.I. Pigment Blue 18 | 2 wt % |
| Magenta Ink: C.I. Pigment Red 67 | 3 wt % |
| Yellow ink: C.I. Pigment Yellow 13 | 2 wt % |

Liquid medium

| | |
|---|---|
| Styrene/acrylic copolymer ammonium salt (molecular weight 7000, resin component 38%; dispersant) | 1.5 wt % |
| Voncoat 5454 (styrene/acrylic resin emulsion, resin component 45%, manufactured by Dainippon Ink and Chemicals, Inc.) | 5 wt % |
| Maltitol | 7 wt % |
| Glycerin | 10 wt % |
| 2-Pyrrolidone | 2 wt % |
| Ion-exchanged water | Balance |

Evaluation 1: Composite black

The ink sets prepared in Examples 1 and 2 and Comparative Example 1 were used to evaluate the hue of composite black.

A solid image of composite black formed by printing yellow, magenta, and cyan inks, prepared in Examples 1 and 2 and Comparative Example 1, in a ratio of the yellow ink to the magenta ink to the cyan ink of 1:1:1 in terms of the amount of these inks used was formed on a specialty paper for ink jet recording (specialty paper for MJ-700V2C) by means of an ink jet printer MJ-700V2C (manufactured by Seiko Epson Corporation).

The value of $a^*b^*$ was measured for the solid image. In the evaluation of the hue, for the solid image, the $L^*a^*b^*$ color system of the color difference indication method specified in CIE was measured with Macbeth CE-7000 spectrophotometer manufactured by Macbeth. In the evaluation of the composite black, the measured a*b* values were plotted on an a*b* coordinate, and the composite black was evaluated in terms of the absolute value of the distance from a*=0, b*=0 (achromatic color) determined by the following equation:

$$\Delta a^*b^* = (a^{*2} + b^{*2})^{1/2}$$

The evaluation criteria are as follows.

Δa*b* ≦10... good (○)

Δa*b* >10... failure (X)

Evaluation 2: Color development on plain paper

An ink jet printer MJ-700V2C was used in this evaluation test. The reaction solution was printed (100% duty) on the following recording papers, and inks were then printed. For comparison, inks were printed on the recording papers with no reaction solution printed thereon.

The color development of these prints were evaluated according to the following criteria.

Papers for evaluation (1) Xerox P (Xerox Corp.)

(2) Ricopy 6200 (Ricoh Co. Ltd.)

(3) Xerox 4024 3R 721 (Xerox Corp.)

(4) Neenah Bond (Kimberly-Clark)

(5) Xerox R (Xerox Corp.)

(6) Yamayuri (Honshu Paper Co., Ltd.)

The OD value of the prints thus obtained was measured with a Macbeth densitometer (manufactured by Macbeth). The results were evaluated as follows.

Vivid color development for all the plain papers for evaluation and an OD value of not less than 0.9 ... ○

Obscured color development for at least one of the papers for evaluation and an OD value of not less than 0.9 ... Δ

Obscured color development for at least one of the papers for evaluation and an OD value of less than 0.9 ... X Evaluation 3: Lightfastness For the inks of Examples 1 and 2 and Comparative Example 1, a solid (100% duty) image (3 cm×3 cm) of each of the yellow, magenta, and cyan was formed on a specialty paper (specialty paper for ink jet recording, manufactured by Seiko Epson Corporation) previously coated with the reaction solution, and the printed images were exposed to light (xenon Fade-O-meter) for 400 hr.

In the evaluation of the hue, regarding the initial color and the color after the initiation of the lightfastness test for the formed solid image, the L*a*b* color system of the color difference indication method specified in CIE was measured with Macbeth CE-7000 spectrophotometer manufactured by Macbeth, and the color difference between the initial color of the printed image and the color of the printed image after the evaluation of the lightfastness was determined based on the measured L*a*b* values, and the lightfastness of the ink was evaluated in terms of hue change according to the following criteria.

For comparison, a test and evaluation for lightfastness were performed in the same manner as described just above, except that the paper used was a specialty paper, for ink jet recording, not coated with the reaction solution.

The color difference is defined by the following equation.

Color difference: $\Delta E^*ab = [(\Delta L^*)^2 + (\Delta a^*)^2 + (\Delta b^*)^2]^{1/2}$ Evaluation criteria are as follows.

ΔE*ab≦5 for all of yellow, magenta, and cyan inks ... excellent (⊚)

5<ΔE*ab≦10 for all of yellow, magenta, and cyan inks ... good (○)

ΔE*ab>10 for at least one of the three colors ... failure (X)

The evaluation results are summarized in the following table.

TABLE 1

| Example | Evaluation 1 | Evaluation 2 Reaction solution | | Evaluation 3 Reaction solution | |
|---|---|---|---|---|---|
| | | Used | Not Used | Used | Not Used |
| 1 | ○ | ○ | Δ | ⊚ | ○ |
| 2 | ○ | ○ | Δ | ⊚ | ○ |
| 3 | ○ | ○ | Δ | ⊚ | ○ |
| 4 | ○ | ○ | Δ | ⊚ | ○ |
| 5 | ○ | ○ | Δ | ⊚ | ○ |
| 6 | ○ | ○ | Δ | ⊚ | ○ |
| 7 | ○ | ○ | Δ | ⊚ | ○ |
| 8 | ○ | ○ | Δ | ⊚ | ○ |
| Comparative Example 1 | X | ○ | X | X | X |

What is claimed is:

1. A cyan ink composition for ink jet recording, comprising at least one pigment represented by the following formula (I):

wherein x is an integer of 0 to 3; and a pigment represented by the following formula (II):

2. The cyan ink composition according to claim 1, wherein the pigment represented by the formula (I) is C.I. Pigment Blue 60, 22, 64, or 21.

3. The cyan ink composition according to claim 1, wherein the pigment represented by the formula (II) is C.I. Pigment Blue 15:3.

4. The cyan ink composition according to claim 1, wherein the weight ratio of the pigment represented by the formula (I) to the pigment represented by the formula (II) is 1:2 to 1:10.

5. The cyan ink composition according to claim 1, which further comprises a resin emulsion.

6. A yellow ink composition for ink jet recording, comprising a pigment represented by the following formula (III):

wherein $Y_1$ to $Y_8$ each independently represents a chlorine or hydrogen atom and R represents o-phenylene or 2,6-xylyl, or C.I. Pigment Yellow 138, 150 or 180.

7. The yellow ink composition according to claim 6, which comprises C.I. Pigment Yellow 109 and C.I. Pigment Yellow 110 as the pigment represented by the formula (III).

8. The yellow ink composition according to claim 7, wherein the weight ratio of C.I. Pigment Yellow 109 to C.I. Pigment Yellow 110 is 60:40 to 99:1.

9. The yellow ink composition according to claim 6, which further comprises a resin emulsion.

10. An ink set for ink jet recording, comprising a cyan ink composition, a magenta ink composition, and a yellow ink composition, the cyan ink composition being one according to claim 1.

11. An ink set for ink jet recording, comprising a cyan ink composition, a magenta ink composition, and a yellow ink composition, the yellow ink composition being one according to claim 6.

12. The ink set according to claim 10, wherein the magenta ink composition comprises, as a colorant, a pigment represented by the following formula (IV):

wherein $X_1$ to $X_{10}$ each independently represent a hydrogen or chlorine atom or a methyl group.

13. The ink set according to claim 12, wherein the pigment represented by the formula (IV) in the magenta ink composition is C.I. Pigment Red 122 or C.I. Pigment Red 209.

14. The ink set according to claim 13, wherein the cyan ink composition comprises C.I. Pigment Blue 60 or C.I. Pigment Blue 15:3.

15. The ink set according to claim 12, wherein the magenta ink composition further comprises a resin emulsion.

16. The ink set according to claim 10, wherein the concentration of the magenta pigment in the magenta ink composition and the concentration of the yellow pigment in the yellow ink composition each are higher than the concentration of the cyan pigment in the cyan ink composition.

17. The ink set according to claim 16, wherein the pigment concentration is not more than 6% by weight for all the ink compositions and the ratio of the pigment concentration (% by weight) of the cyan ink composition to the pigment concentration (% by weight) of the magenta ink composition to the pigment concentration (% by weight) of the yellow ink composition is 1:1 to 2:1 to 3.

18. A method for ink jet recording, comprising the step of: depositing a reaction solution containing a reactant and an ink composition onto a recording medium to conduct printing,
    wherein the ink composition is the cyan ink composition according to claim 1, and
    the reactant breaks the state of dispersion and/or dissolution of the pigment to cause agglomeration.

19. A method for ink jet recording, comprising the step of: depositing a reaction solution containing a reactant and an ink composition onto a recording medium,
    wherein the ink composition is the yellow ink composition according to claim 6, and
    the reactant breaks the state of dispersion and/or dissolution of the pigment to cause agglomeration.

20. A method for ink jet recording, comprising the step of: depositing a reaction solution containing a reactant and an ink composition onto a recording medium,
    wherein the ink composition is one in the ink set according to claim 10, and
    the reactant breaks the state of dispersion and/or dissolution of the pigment to cause agglomeration.

21. The method according to claim 18, wherein the step of ejecting droplets of the ink composition onto the recording medium to record an image is performed after the step of depositing the reaction solution onto the recording medium.

22. The method according to claim 18, wherein the step of ejecting droplets of the ink composition onto the recording medium to record an image is performed before the step of depositing the reaction solution onto the recording medium.

23. The method according to claim 18, wherein the reactant is a polyvalent metal salt and/or polyallylamine.

24. The method according to claim 23, wherein the polyvalent metal salt is a salt of nitric acid or a salt of a carboxylic acid.

25. A record printed by the method according to claim 18.

26. An ink set for ink jet recording, comprising a cyan ink composition, a magenta ink composition, and a yellow ink composition, the cyan ink composition being one according to claim 1, the yellow ink composition comprising a pigment represented by the following formula (III):

wherein $Y_1$ to $Y_8$ each independently represent a chlorine or hydrogen atom and R represents o-phenylene or 2,6-xylyl, or C.I. Pigment Yellow 74, 138, 150 or 180.

27. The ink set according to claim 16, wherein the concentration of magenta pigment in the magenta ink composition and the concentration of the yellow pigment in the yellow ink composition each is higher than the concentration of the cyan pigment in the cyan ink composition.

* * * * *